United States Patent [19]

Adam

[11] 4,228,694

[45] Oct. 21, 1980

[54] SHIFT MEANS FOR A MULTI-SHAFT SLIDING GEAR

[75] Inventor: Hans H. Adam, Vaterstetten, Fed. Rep. of Germany

[73] Assignee: Friedrich Deckel Aktiengesellschaft, Munich, Fed. Rep. of Germany

[21] Appl. No.: 11,516

[22] Filed: Feb. 12, 1979

[30] Foreign Application Priority Data

Feb. 17, 1978 [DE] Fed. Rep. of Germany ....... 2806904

[51] Int. Cl.³ .............................................. F16H 3/22
[52] U.S. Cl. ....................................... 74/342; 74/344; 74/337.5
[58] Field of Search ....................... 74/365, 337.5, 340, 74/342, 344

[56] References Cited

U.S. PATENT DOCUMENTS

| | | | |
|---|---|---|---|
| 2,755,679 | 7/1956 | Nallinger | 74/337.5 |
| 3,110,880 | 11/1963 | Fieser et al. | 74/342 X |
| 3,280,651 | 10/1966 | Hermann | 74/365 |
| 3,677,104 | 7/1972 | Hirozawa et al. | 74/337.5 X |

*Primary Examiner*—C. J. Husar
*Assistant Examiner*—Frank McKenzie
*Attorney, Agent, or Firm*—Blanchard, Flynn, Thiel, Boutell & Tanis

[57] ABSTRACT

A shifting device for a multi-shaft sliding gear arrangement having a plurality of sliding gear blocks displaceable in an axial direction, each one of which is connected, by way of a mechanical transmission device, to a separate electric servo-drive. Each servo-drive comprises an electric servo-motor equipped with a gear reduction unit and a planar cam drive which is arranged between the servo-motor and the transmission device and has a pivotal output lever. The output lever is connected to a sliding gear block at an end remote from the pivotal support therefor. The two end positions of movement of the output lever correspond to the end positions of the sliding gear block.

13 Claims, 10 Drawing Figures

SHIFT MEANS FOR A MULTI-SHAFT SLIDING GEAR

FIELD OF THE INVENTION

The invention relates to a shift means for a multi-shaft sliding gear having a plurality of sliding gear blocks displaceable in the axial direction, each one of which is connected, by way of a mechanical transmission means, to a separate electric servo-drive.

BACKGROUND OF THE INVENTION

Shift means of the above stated kind are known wherein the servo-drives are pneumatic or hydraulic operating cylinders. Particularly in those cases where each sliding gear block can occupy more than two positions, the design and fitting of such a means are very complicated and therefore very expensive. Since each pneumatic or hydraulic operating cylinder can occupy only two specific positions and can therefore bring the sliding gear blocks into only two positions, a further operating cylinder has to be provided for each of the additional positions of the sliding gear blocks.

The object of the present invention is to provide a shift means of the initially stated kind which is simple in construction and inexpensive to produce, and which requires little space.

According to the invention, this object is achieved in that each servo-drive comprises an electric servo-motor equipped with a gear reduction unit and a planar cam drive which is arranged between said servo-motor and the transmission means and has a swinging output lever, the two end positions of the output lever corresponding to the end positions of the sliding gear block.

Electric servo-motors are among the very simplest of servo-drives. Since they are used in large numbers in other technical fields (e.g. as windshield-wiper motors in automobiles), they have been very fully developed and are inexpensive. The gear reduction unit connected downstream, on the one hand, increases the resolution of the entire servo-drive in relation to gear reduction and, on the other hand, also permits the use of small motors having relatively low torque, so that the space required for accommodating the entire unit can be kept small. A further advantage over pneumatic and hydraulic drives, in particular, is that electric servo-motors are able to occupy not just two specific shift positions, but any required number of readily reached intermediate positions.

By means of the cam drive the rotary movement of the electric servo-motor is converted into a reciprocatory movement as finally needed for displacing the sliding gear blocks. A cam drive also represents a simple and inexpensive component which occupies little space.

In accordance with one feature of the invention, the cam drive comprises a cam disc having a closed control curve. Thus, use can be made of a servo-motor having only one direction of rotation, which motor can be held in a very simple manner particularly at its control part. With this arrangement, any position of the shift means can be approached in one direction of rotation, since all the shift positions are periodically repeated during one revolution of the cam disc. According to a further feature of the invention and for the purpose of displacing a sliding gear block having two shift positions, use can be made of a cam disc, the control curve of which takes the form of a solid body or triangular eccentric.

In accordance with yet another feature of the invention, the cam disc has an open control curve, and the servo-motor must then be designed to move to the right and to the left.

According to a still further feature of the invention, the control curves each have, in the zones corresponding to an engagement position of the sliding gear blocks, portions which extend at least substantially concentrically in relation to the axis of rotation of the cam disc. The angular position of the output lever does not change in these zones even when the cam disc still rotates to a slight extent. In this way it becomes possible to dispense with a precise and angularly accurate stoppage of the servo-motor in its shift positions, since small inaccuracies in the angular position of the cam disc in the zone of the shift position do not affect the angular position of the output lever.

The cam disc can be provided with a control curve in the form of a channel in which a guide shaft or the like, arranged on the output lever, is guided on a shape-locking basis, or the cam disc may have a peripheral shape which forms the control curve and against which a guide roller arranged on the output shaft bears in a mechanically positive manner.

In a further embodiment of the invention, a planar crank drive with a swinging output lever is arranged between the electric servo-motor, provided with a reduction gear, and the transmission means, the two end positions of the sliding gear block corresponding to the end positions of the output lever. The crank drive is preferably designed as a crank oscillator which comes to a stop approximately in the zone of the end positions of the output lever.

In accordance with yet another feature of the invention, the servo-motors are controlled by a manually operated preselection switch for feeding in the required values, by cam discs which are each driven by the servo-motor itself and signal particular actual positions of the sliding gear blocks by way of limit switches, and by a comparator for comparing the required and actual positions and for switching off the servo-motors when the preselected gear position is reached.

BRIEF DESCRIPTION OF THE DRAWINGS

Further features of the invention will be apparent from the description. A number of examples will now be described in greater detail and by reference to the drawings, in which.

DETAILED DESCRIPTION

Figure 1:
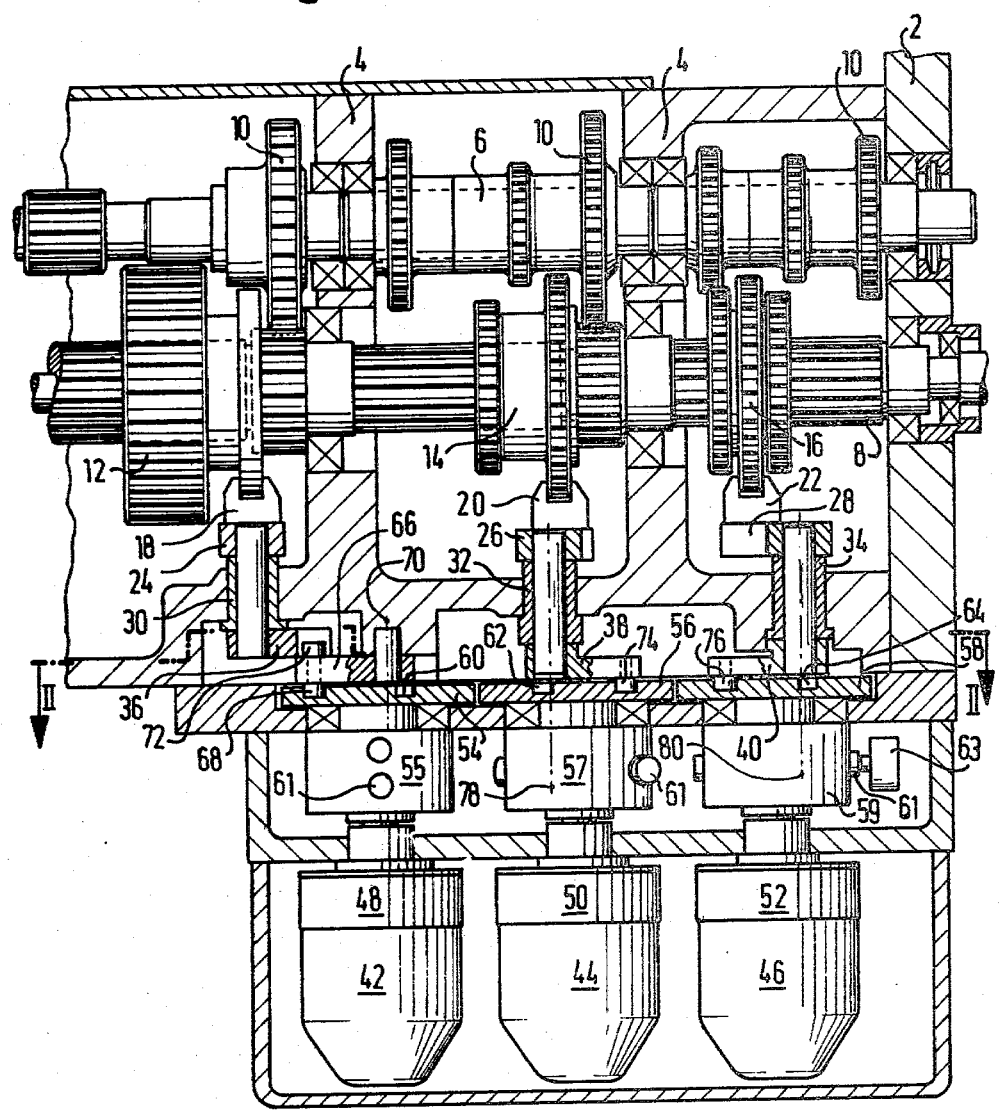
FIG. 1 illustrates a multi-stage shift gear with three sliding gear blocks and three servo-drives.

The shift gear shown in FIG. 1 comprises a housing 2 having a plurality of weblike walls 4, two gear shafts 6 and 8, as well as gears mounted on the gear shafts. The gears 10 are fixedly secured on the gear shaft 6, whereas the gears associated with the gear shaft 8 are assembled to form sliding gear blocks 12, 14, 16, which can be axially displaced on this gear shaft, but are connected to the shaft so as to rotate therewith, as by a splined connection. In this way each of the sliding gear blocks can be brought into engagement with different gears 10 on the shaft 6, and various transmission ratios can thus be established. For displacing the sliding gear blocks 12, 14 and 16, use is made of claws of shifting forks 18, 20 and 22 which, in a known manner, each embrace one of the gears or a separate adjusting disc on the sliding gear blocks 12, 14 and 16, respectively. The shifting forks 18, 20 and 22 are rotatably mounted on crank arms 24, 26 and 28. The crank arms in turn are connected to the servo-drives as explained in more detail below. The shift gear arrangement as so far described, forms part of the prior art.

The crank arms 24, 26 and 28 are each secured to a spindle 30, 32 and 34 respectively. Arranged at the ends of the spindles 30, 32 and 34 remote from the crank arms 24, 26 and 28 are actuating levers 36, 38 and 40 which can be displaced directly or indirectly by the servo-drives.

Each of the servo-drives is formed by an electric motor 42, 44 and 46, to the output of which is connected a gear reduction unit 48, 50 and 52, respectively. The reduction gears in the gear reduction units have a reduction ratio of 40:1, for example, so that the resolution of the servo-drive, i.e. the precision of the angular position of the electric motors is improved 40 times. Secured to the output shaft of the gear reduction units are cam discs 54, 56 and 58 which are rotated by the electric motors.

Figure 2:
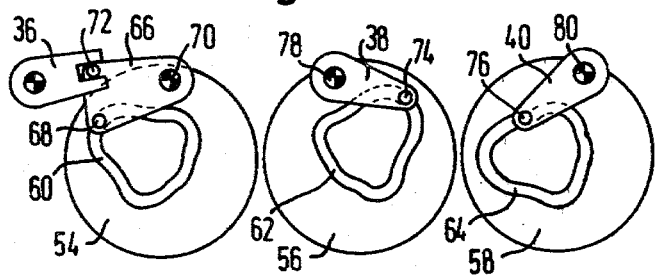
FIG. 2 diagrammatically illustrates a cross section taken along the line II—II of FIG. 1.

As shown particularly clear in FIG. 2, the cam discs 54, 56 and 58 are provided respectively with control curves 60, 62 and 64 each in the form of a channel. Guided in the control curve 60 is a guide roller 68, secured to an auxiliary lever 66, so that this lever, upon rotation of the cam disc 54 through a certain angular range, is reciprocated about a pivot shaft 70. The actuating lever 36 is linked to the auxiliary lever to turn about the point 72. The actuating levers 38 and 40 are connected by way of guide rollers 74 and 76 received in control channels 62, 64, respectively, directly to the cam discs 56 and 58 and are moved by these in their pivotal zone about the pivot shafts 78 and 80.

Arranged between each gear reduction unit 48, 50 and 52 and the corresponding cam discs 54, 56 and 58 are discs 55, 57 and 59 respectively, each having a cam 61 and communicating the actual position of the discs 54, 56 and 58 to the control system for the shift means, as will be described in greater detail below. The cams 61 each actuate a limit switch, only one of which, switch 63, is shown for the sake of greater clarity.

Figure 3A:
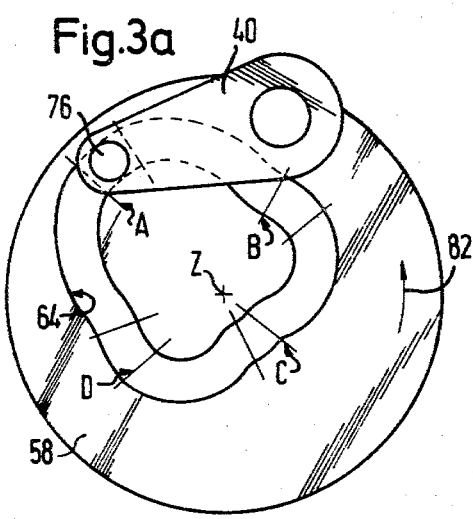
FIGS. 3a through 3c illustrate a cam disc as in FIG. 2 and in various positions.
Figure 3B:
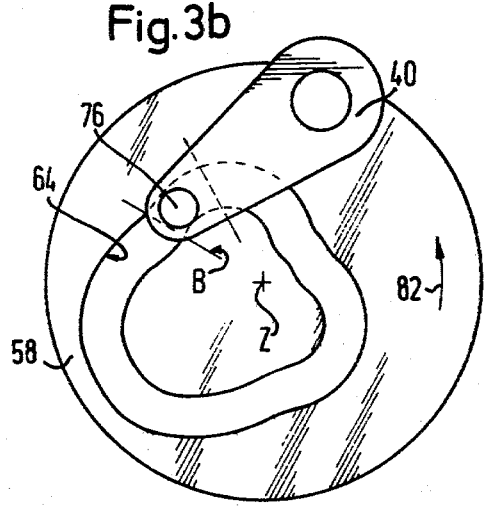
Figure 3C:
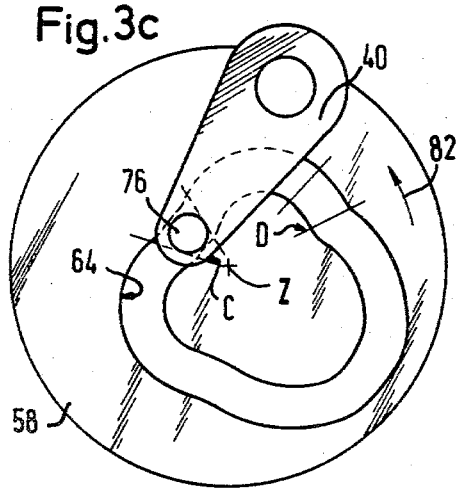

As shown in FIG. 1, the sliding gear block 12 is a double block which can occupy two effective positions; the sliding gear blocks 14 and 16 are triple blocks each having three effective positions. The control curve or channel 64 of the cam disc 58 is substantially heart-shaped for example (FIGS. 3a through 3c). This results in four curved portions A, B, C and D, each of which is concentric to the central pivot axis Z of the cam disc. When the guide roller 76 is in one of these curve portions, small angular displacements of the cam disc do not cause any change in the angular position of the actuating lever 40, so that the positioning precision of normal electric motors, particularly after a reduction of 40:1, is quite sufficient to obtain accurate positioning of the actuating lever and therefore of the sliding gear blocks.

The curved portion A is at the greatest radial distance from the central axis Z. In the position illustrated in FIG. 3a, the actuating lever 40 deflects to its maximum extent in one direction, and the sliding gear block 16 occupies its leftmost end position. The curved portion B corresponds to a median position, and the curved portion C to the rightmost end position of the sliding gear block 16. Upon further rotation of the cam disc 58 from the FIG. 3c position and in the direction of the arrow 82, the guide roller 76 moves into the curved portion D, which again corresponds to the median position of the sliding gear block 16 as in FIG. 3b. Thus, all of the positions of the sliding gear block can be attained during rotation of the electric motor 46 in one direction, the median position of the sliding gear block being reached twice during one revolution of the shift disc 58.

The cam discs 56 and 54 differ from the abovedescribed arrangement only as regards the placement of the actuating lever, so that they do not need to be described in detail. In the present embodiment and for production reasons, a cam disc with three shift positions corresponding to the cam discs 62 and 64 was likewise selected for controlling the double block 10, the zones B and D then performing no function.

Figure 4:
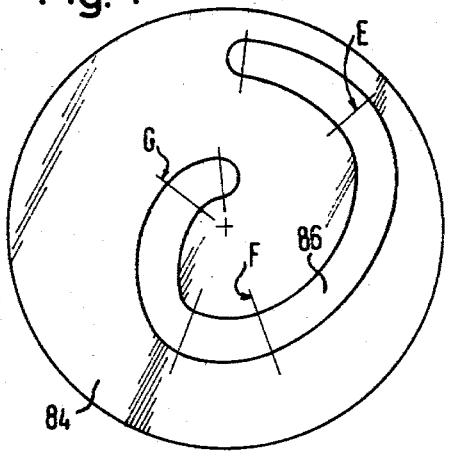
FIG. 4 illustrates a cam disc having an open control curve.

FIG. 4 shows a cam disc 84 with an open control curve 86. This is made up of three portions E, F and G, which are likewise each disposed concentrically in relation to the central axis of rotation Z of the cam disc 86. The portion E corresponds to one of the end positions, the portion F to the median position, and the portion G to the other end position of a sliding gear block controlled by this cam disc. In this form of cam disc, the electric motor must be reversible so as to return, for example, from portion G to portion E.

Figure 5:
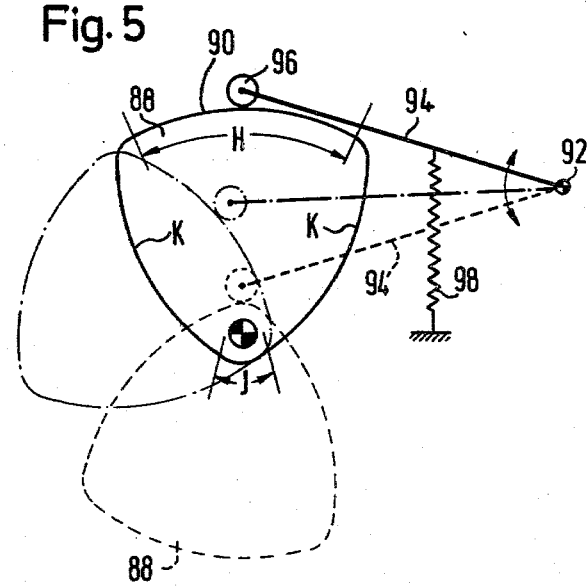
FIG. 5 diagrammatically illustrates a cam disc having a peripheral shape forming a control curve.

FIG. 5 illustrates diagrammatically a cam disc 88, the periphery of which forms a control curve 90. The actuating lever 94, pivotally mounted at 92, carries at its free end a guide roller 96 which bears on the control curve 90. A spring 98 provides the necessary pressure. The cam disc 88 is in the form of a solid body or triangular eccentric. Each of the curved portions H and J are again concentric with the axis of rotation Z of the cam disc and ensure that the shift means is to some extent insensitive to small inaccuracies in the angular position of the cam disc. The portions K are simply connecting zones between the portions H and J, and they perform no shift function. A cam disc as shown in FIG. 5 is used primarily for controlling a double block, and the positions of the cam disc 88 and of the actuating lever 94 that are shown in solid and broken lines represent the two shift positions.

Figure 6:
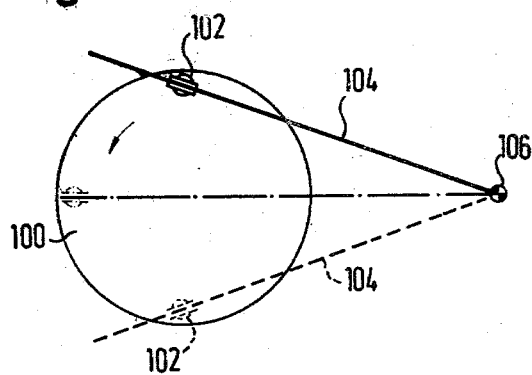
FIG. 6 illustrates a servo-drive designed as a crank oscillator.

FIG. 6 illustrates a further embodiment wherein the crank drive is designed as a crank oscillator. The crank oscillator 100 carries a guide piece 102 which is mounted to rotate thereon and in which the guide lever 104 can be displaced and guided. During one revolution of the cam disc 100, the actuating lever 104 is swung about its pivot axle 106 between the end position shown as a solid line and that shown as a broken line. At these end positions the pivoting movement of the actuating lever comes almost to a stop so that a small inaccuracy in the angular position of the crank disc does not result in any substantial change in the angular position of the actuating lever and therefore in the position of the sliding gear block connected thereto. This arrangement is also eminently suitable for double blocks, since the median positions of the actuating lever 104 (dash-dot line) are not rest positions, but on the contrary are very sensitive to positional inaccuracies.

Figure 7:
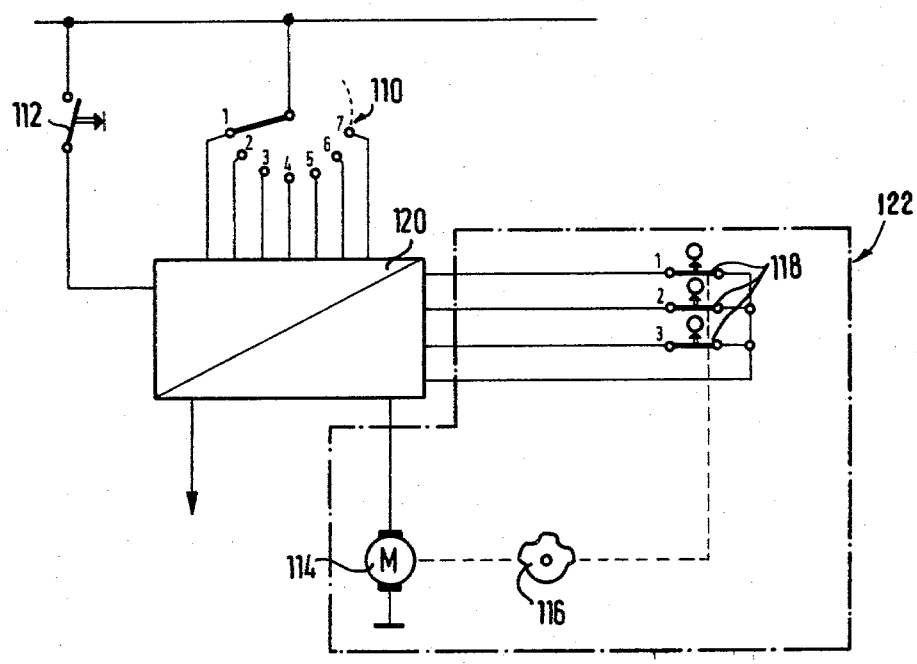
FIG. 7 shows a circuit diagram relating to the control of a shift gear as illustrated in FIG. 1.

FIG. 7 shows a block diagram for the control of the gear shift system in accordance with the invention. A preselection switch 110 serves for selecting the required gear, the gears being numbered from 1 upwards, for example, or being indicated as speeds of revolution. After a switch 112 has been actuated, the electric motors 114, only one of which is illustrated, move into their positions indicated by the position of the preselection switch. A cam disc 116, driven by the electric motor, actuates the limit switch 118. Upon reaching the required position, which is determined by the comparator 120 comparing the preselected signals with the signals fed in through the limit switches 118, the electric motors 114 are switched off. The entire unit 122, containing the electric motors 114, the cam disc 116 and the limit switches 118, is illustrated only at one point, but one such unit is provided for each gear slide block.

Figure 8:
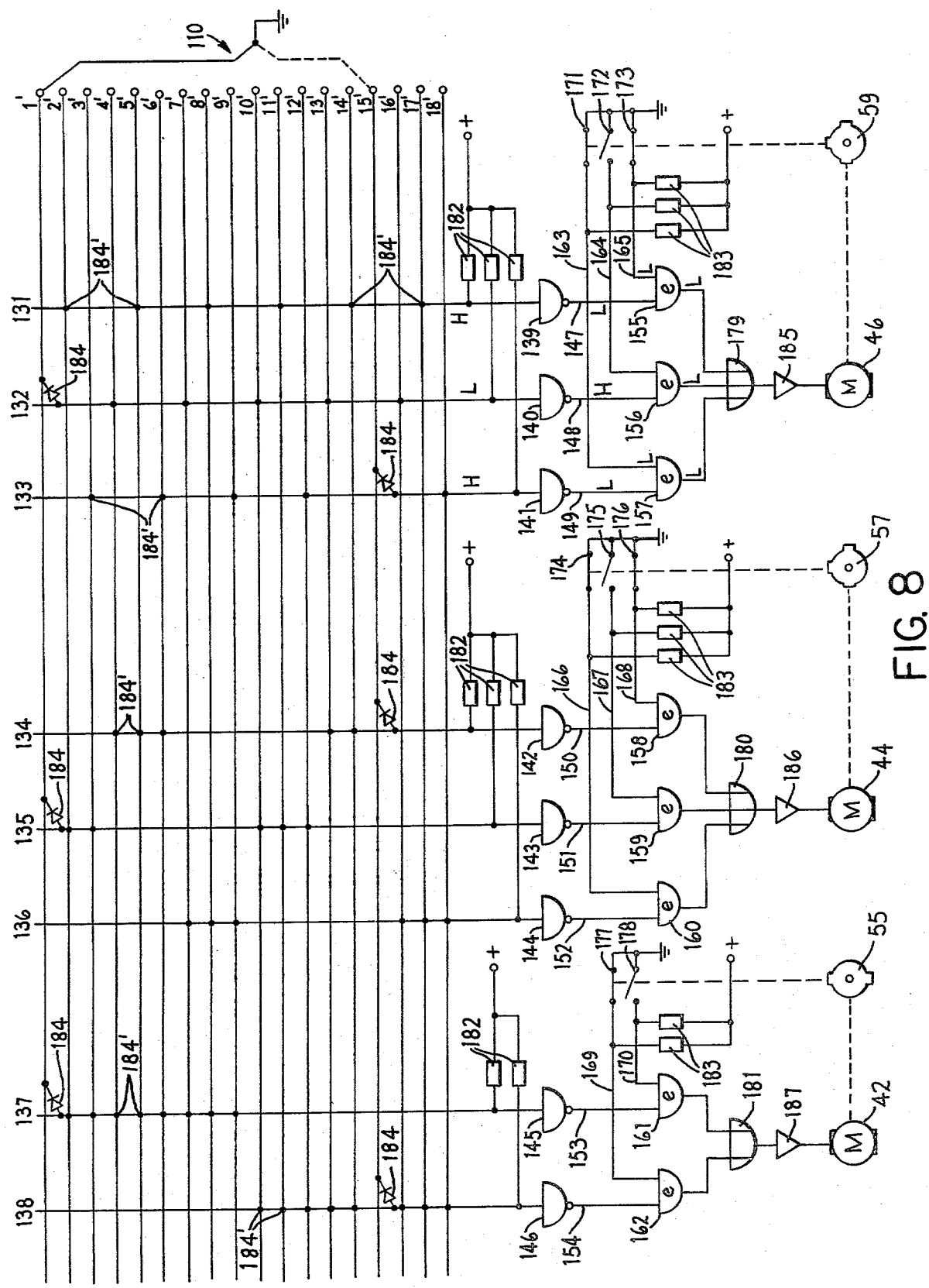
FIG. 8 is a more detailed schematical circuit diagram for the comparator circuit shown in FIG. 7.

Further details of the circuit 120 are shown in FIG. 8. The electric motors 42, 44, 46 each correspond to the motors shown in FIG. 1 and to the single motor 114 shown in FIG. 7. Each motor is connected to a respective one of the sliding gear blocks 12, 14, 16; the sliding gear block 12 of which can assume two positions, the sliding gear blocks 14, 16 of which can assume three positions, the combination permitting 2×3×3=18 gear steps or combinations.

Thus the preselector switch 110 can assume in this circuit 18 switching positions. The switch contacts are connected to the lines 1' to 18', which lines are connected to control lines 131, 132, 133 for the motor 46, control lines 134, 135, 136 for the motor 44 and control lines 137, 148 for the motor 42 and are further connected to these lines according to a certain scheme, as will be discussed later.

The control lines 131 to 138 are each connected to inverters 139 to 146, respectively, the output lines 147 to 154 of which are each connected to the respective one of the exclusive OR gates 155 to 162. In addition, the lines 163 to 170 are each connected to the respective one of the exclusive OR gates and to the limit switches 171 to 178. The output lines of the exclusive OR gates 155 to 157 are connected to the OR gate 179, the output lines of the exclusive OR gates 158 to 160 to the OR gate 180 and the output lines of the exclusive OR gates 161, 162 are connected to the OR gate 181. Output amplifiers 185 to 187 are connected between the OR gates 179 to 181, respectively, and the motors 46, 44, 42.

The preselector switch 110 and the limit switches 171 to 178 are each connected to a negative pole of d.c. source or ground. The control lines 131 to 138 are each connected through resistors 182 to a positive pole of a d.c. source. The lines 163 to 170 which are each connected to the inverters 155 to 162 are also connected through resistors 183 to the positive pole of the d.c. source.

The connection between the lines 1' to 18' and the control lines 131 to 138 are each created through diodes (for example the diode 184), each of which conducts only in the direction from the control lines to the lines 1' to 18'. In this manner it is possible to electrically isolate the control lines of the electric motors from the lines 1' to 18'. For a better understanding only, certain diodes have been illustrated in FIG. 8; the other diodes are schematically illustrated as enlarged dots, some of which are identified by the reference 184'.

The control lines 131 to 138 and the lines 163 to 170 can assume two voltage conditions, namely they can be a HI voltage (H) or a LO voltage (L), depending on whether or not they are connected to the negative pole of the d.c. source. If, for example, the lines 163 to 170 are connected to ground through closed limit switches 171 to 178, the voltage on lines 131 to 138 will be LO.

When the preselector switch 110 assumes the solid line position 1' in FIG. 8, the control line 132 is connected through the diode 184 and the preselector switch 110 to the negative pole and the line 132 assumes the LO condition schematically illustrated in FIG. 8 by the character L. The control lines 131 and 133 are in the HI condition schematically illustrated by the character H. The LO condition is then applied to the input of the inverter 140 which converts the LO condition into a HI condition at its output. A HI condition is applied to the inputs of the inverters 139, 141 and converted to a LO condition at their outputs. The lines 163 to 165 are each in the LO condition when the limit switches 171 to 173 are each closed, so that equal inputs are applied to the terminals of the exclusive OR gates 155 and 157 and thus a LO condition exists at the output of the gates 155 and 157; HI and LO conditions are applied to the input terminals of the exclusive OR gate 156, when the limit switch 172 is closed, so that its output becomes HI. Unequal inputs to the OR gate 179 results in a HI condition at its output, which initiates an operation of the motor 46. Only when the limit switch 172 is opened by the cam plate 59 does the line 164 assume a HI condition, at which time both of the inputs to the exclusive OR gate 156 become equal to make the output thereof assume a LO condition L, which deactivates the motor 46. The motor stops accordingly in its centered position which is associated with the central limit switch 172.

In the same manner, the motor 44 stops in its central position, which corresponds with the center limit switch 175, the motor 42 in the rightmost positon which corresponds with the limit switch 178.

During a switching of the preselector switch 110, for example, to the broken line position 15', the motor 46 will operate until the opening of the limit switch 171, the motor 44 will operate until the opening of the limit switch 176, and the motor 42 will operate until the opening of the limit switch 177, each of which corresponds with the left limit position of the motor 46 and the therewith connected sliding gear block 16, the right limit position of the motor 44 with the therewith connected sliding gear block 14 and the left limit position of the motor 42 with the therewith connected sliding gear block 12.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a shift means for a multi-shaft sliding gear having a plurality of sliding gear blocks displaceable in the axial direction, each one of which is connected, by way of a mechanical transmission means, to a separate electric servo-drive, the improvement comprising wherein each servo-drive comprises an electric servo-motor equipped with a gear reduction unit, and a planar cam drive which is arranged between said servo-motor and the transmission means and has a swinging output lever, the two end positions of the output lever corresponding to the end positions of the sliding gear block.

2. The improved shift means according to claim 1, wherein the cam drive has a cam disc having a closed control curve.

3. The improved shift means according to claim 2, wherein the control curve is formed by a solid body or triangular eccentric.

4. The improved shift means according to claim 1, wherein the cam drive has a cam disc with an open control curve, the servo-motor being designed to run to the right and to the left.

5. The improved shift means according to claim 2, wherein the control curves each have, in the zones corresponding to an engagement position of the sliding gear blocks, curve portions extending at least approximately concentrically with the pivotal axis of the cam disc.

6. The improved shift means according to claim 2, wherein the cam discs are each provided with control curves in the form of channels in which guide rollers or the like, arranged on the output levers, are guided on a shape-locking basis.

7. The improved shift means according to claim 2, wherein the cam disc has a peripheral shape constituting a control curve against which a guide roller or the like, arranged on the output lever, bears in a mechanically positive manner.

8. The improved shift means according to claim 1, wherein a planar crank drive with a swinging output lever is arranged between an electric servo-motor, provided with a gear reduction unit, and the transmission means, the two end positions of the sliding gear block corresponding to the end positions of the output lever.

9. The improved shift means according to claim 8, wherein the crank drive is designed as a crank-slide oscillator which is substantially motionless in the zone of the end positions of the output lever.

10. The improved shift means according to claim 1, wherein the shafts of the output levers each have at their end remote from the output lever an actuating lever which is in direct engagement with the associated sliding gear block.

11. The improved shift means according to claim 1, wherein the sliding gear blocks are able to occupy at most three engagement positions.

12. The improved shift means according to claim 1, wherein the cam discs for all the sliding gear blocks of the gear are similar, and in that any differences that may occur in the displacement distances of the sliding gear blocks are taken into account by differences in the transmission ratios in the transmission means cooperating with the cam drive.

13. The improved shift means according to claim 1, wherein the servo-motors are controlled by a manually operated preselection switch for feeding in the required values, by cam discs, each driven by the servo-motor itself and which signal the particular position of the sliding gear blocks through limit switches, and by a comparator for comparing the required position and the actual position and for switching off the servo-motors when the preselected gear position is reached.

* * * * *